US012798026B2

(12) United States Patent
Shibahara et al.

(10) Patent No.: US 12,798,026 B2
(45) Date of Patent: Nov. 17, 2026

(54) MAIN SPINDLE DEVICE FOR MACHINE TOOL

(71) Applicant: TSUDAKOMA KOGYO KABUSHIKI KAISHA, Ishikawa-Ken (JP)

(72) Inventors: Masato Shibahara, Ishikawa-ken (JP); Junsho Tanaka, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 311 days.

(21) Appl. No.: 18/616,516

(22) Filed: Mar. 26, 2024

(65) Prior Publication Data

US 2024/0342845 A1 Oct. 17, 2024

(30) Foreign Application Priority Data

Apr. 11, 2023 (JP) ................................ 2023-064361

(51) Int. Cl.
*B23Q 1/70* (2006.01)

(52) U.S. Cl.
CPC .................................... *B23Q 1/70* (2013.01)

(58) Field of Classification Search
CPC ........................... B23Q 1/70; B23Q 2220/004
See application file for complete search history.

(56) References Cited

U.S. PATENT DOCUMENTS

2010/0247262 A1 9/2010 Sakane et al.
2010/0290854 A1 11/2010 Tatsuda
2010/0310335 A1 12/2010 Tatsuda et al.
2013/0047896 A1* 2/2013 Fujimoto ............ B23Q 1/0027 108/50.11
2018/0361524 A1* 12/2018 Tachiki ................ B23Q 16/105
2019/0126422 A1* 5/2019 Tezuka ................... B23Q 15/00
2021/0162556 A1* 6/2021 Kiriki .................... B23Q 16/10
(Continued)

FOREIGN PATENT DOCUMENTS

CN 101511527 A 8/2009
CN 101918173 A 12/2010
JP H10-058254 A 3/1998
(Continued)

OTHER PUBLICATIONS

Sep. 16, 2024, European Search Report issued for related EP Application No. 24165974.7.
(Continued)

*Primary Examiner* — Alan Snyder
(74) *Attorney, Agent, or Firm* — Paratus Law Group, PLLC

(57) ABSTRACT

A main spindle device for a machine tool including a rotary joint configured by a distributor fixedly provided to a frame and a shaft provided to be non-rotatable to a main spindle. The rotary joint is configured by a first rotary joint part and a second rotary joint part that are continuous in an axis line direction of a main spindle. The first rotary joint is the other end side of the frame and is configured by a first distributor having a shaft shape and a first shaft having a cylindrical shape, and the second rotary joint is configured by a second distributor having a cylindrical shape and a second shaft having a shaft shape.

1 Claim, 1 Drawing Sheet

(56) References Cited

U.S. PATENT DOCUMENTS

2021/0283737 A1* 9/2021 Beck .................... B23Q 16/105

FOREIGN PATENT DOCUMENTS

| | | | |
|---|---|---|---|
| JP | 2002-018678 | A | 1/2002 |
| JP | 2008-073840 | A | 4/2008 |
| JP | 2010-125559 | A | 6/2010 |
| JP | 2014-161995 | A | 9/2014 |
| JP | 2019-126422 | A | 8/2019 |
| JP | 2022-184440 | A | 12/2022 |
| WO | WO 2009/013912 | A1 | 1/2009 |

OTHER PUBLICATIONS

May 7, 2026, Japanese Office Action issued for related JP Application No. 2023-064361.

* cited by examiner

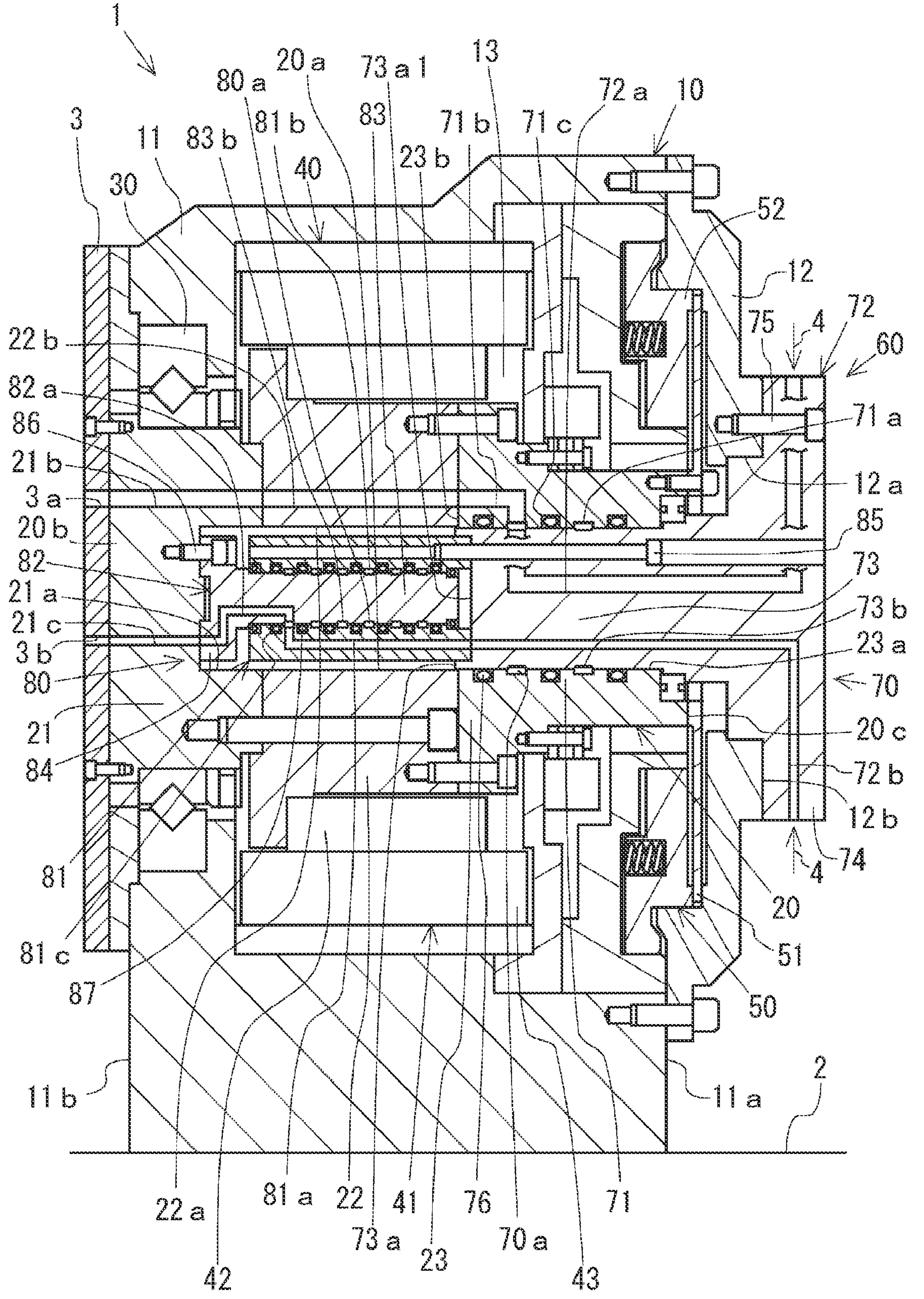
1
3
11
30
83 b
80 a
81 b
40
20 a
83
73 a 1
23 b
13
71 b
71 c
72 a
10
52
12
75
4
72
60
22 b
82 a
86
21 b
3 a
20 b
82
21 a
21 c
3 b
80
21
84
81
81 c
87
71 a
12 a
85
73
73 b
23 a
70
20 c
72 b
12 b
74
4
20
51
50
11 b
11 a
2
22 a
42
81 a
22
73 a
41
23
76
70 a
43
71

MAIN SPINDLE DEVICE FOR MACHINE TOOL

CROSS-REFERENCE TO RELATED APPLICATION(S)

This application is based on and claims priority under 35 USC 119 from Japanese Patent Application No. 2023-064361 filed on Apr. 11, 2023, the contents of which are incorporated herein by reference.

TECHNICAL FIELD

The present invention relates to a main spindle device for a machine tool including a main spindle having a tip end portion to which a rotation target member is attached, the main spindle being rotatably supported to a frame so that the tip end portion becomes one end side of the frame, and a rotary joint configured by a distributor fixedly provided to the frame and a shaft provided to be non-rotatable to the main spindle.

BACKGROUND ART

As a main spindle device for a machine tool, for example, there is a rotary table device configured to index an angular position of a table as a rotation target member on which a workpiece is installed for processing the workpiece. The rotary table device has a main spindle having a tip end portion to which the table is attached. In the rotary table device, the main spindle is accommodated in an accommodation hole formed in the frame in a direction in which the tip end portion becomes one end side of the frame, and is rotatably supported via a bearing in the accommodation hole. Note that a jig or the like for holding the workpiece to be processed is provided on the table.

In addition, the rotary table device is provided with a rotary joint for supplying a working fluid to the jig or the like on the table that is rotationally driven. The rotary joint is configured by a distributor fixedly provided to the frame and a shaft provided to be non-rotatable to the main spindle. Note that one of the distributor and the shaft is formed into a shaft shape and the other is formed into a cylindrical shape, and the other having the cylindrical shape is provided in such a way that the other is slidably fitted on an outer side to one having the shaft shape. In addition, a communication flow path is formed between the distributor and the shaft. The communication flow path is a communication flow path for communicating a flow path formed in one with a flow path formed in the other and is configured by grooves formed along a circumferential direction on each of sliding contact surfaces of the distributor and the shaft.

Additionally, in the rotary joint, seal members are provided on both sides of each communication flow path in order to prevent leakage of the working fluid between the distributor and the shaft from the communication flow path. However, in a general rotary joint, the seal member is provided for the other having the cylindrical shape and becoming an outer side of the distributor and the shaft. As a rotary table device having such a rotary joint, there is a device disclosed in Patent Literature 1 (hereinafter, referred to as "device of the related art").

CITATION LIST

Patent Literature

Patent Literature 1: JP2002-18678A

However, in the rotary joint, since the seal member deteriorates depending on the condition or period of use, and the like, the seal member needs to be replaced on a regular basis. As for the replacement of the seal member, in the device of the related art, the shaft-shaped distributor provided on the inner side is configured to be removable from the frame, so the seal member can be replaced by removing the distributor from the frame. That is, when the distributor is removed from the frame, an inner peripheral surface of the cylindrical shaft provided on the outer side is exposed, and the seal member provided on the inner peripheral surface is also exposed, so the seal member can be replaced in the state formed as such.

However, in the device of the related art, the rotary joint has a dimension (length) that occupies the majority of the device in an axis line direction of the main spindle. As such, when the rotary joint has a large dimension in the axis line direction, from one end side of the shaft that becomes an opening side as a result of removing the distributor, it is difficult for a hand to reach a seal member located on an end portion side (rear side) opposite to the one end side, so replacing the seal member becomes very difficult.

On the other hand, in the device of the related art, the shaft can also be removed from the frame. When the shaft on which the sealing member is provided can be removed from the device as such, the sealing member can be replaced outside the device, so the replacement operation can be performed easily, compared to a case where the replacement operation is performed on the device. However, in this case, in addition to removing the distributor from the device as described above, an operation of removing the shaft from the device should also be performed, and an operation of attaching the shaft to the device after replacing the seal member is also required, making the operation extremely complicated and time-consuming.

SUMMARY

The present invention has been made in view of the above situations, and an object thereof is to provide a configuration of enabling an operation of replacing a seal member to be easily performed for a main spindle device having a rotary joint for a machine tool.

An preamble of the present invention is a main spindle device for a machine tool including a main spindle having a tip end portion to which a rotation target member is attached, the main spindle being rotatably supported to a frame so that the tip end portion becomes one end side of the frame, and a rotary joint configured by a distributor fixedly provided to the frame and a shaft provided to be non-rotatable to the main spindle.

In addition, in order to achieve the above object, in the main spindle device for a machine tool on which the present invention is premised, the rotary joint is configured by a first rotary joint part and a second rotary joint part. The first rotary joint part is configured by a first distributor having a shaft-shaped main body portion as a main body and a flange portion at an end portion of the main body portion, the first distributor being attached an end surface of the other end side of the frame at the flange portion in a form of the main body portion being accommodated in the frame, and a first shaft having a cylindrical shape and fitted to the main body portion. In addition, the second rotary joint part is configured by a second distributor having a cylindrical shape, provided to be concentrically continuous to the main body portion on an opposite side to the flange portion side in an axis line direction of the main body portion, and having an outer diameter equal to or smaller than an outer diameter of the main body portion, and a second shaft having a shaft shape to which the second distributor is fitted.

In the main spindle device of the present invention, the rotary joint is configured by the first rotary joint part and the second rotary joint part. The first rotary joint part is configured such that the distributor (first distributor) has a shaft shape provided on an inner side and the shaft (first shaft) has a cylindrical shape externally fitted to the first distributor. Therefore, in the first rotary joint part, a seal member is provided on the first shaft. On the other hand, the second rotary joint part is configured such that the shaft (second shaft) has a shaft shape provided on an inner side and the distributor (second distributor) has a cylindrical shape externally fitted to the second shaft. Therefore, in the second rotary joint part, a seal member is provided on the second distributor. The outer diameter of the second distributor is equal to or smaller than the outer diameter of the main body portion of the first distributor.

In addition, in the main spindle device, the first rotary joint part is attached to the end surface of the flange portion of the first distributor on the other end side of the frame, and the second rotary joint part is provided so that the second distributor is concentrically continuous on the opposite side (rear side) to the flange portion side with respect to the main body portion of the first distributor located in the accommodation hole of the frame.

Therefore, according to the configuration, when the first distributor of the first rotary joint part is removed from the frame (pulled out from the accommodation hole) in order to expose the seal member for replacement, the second distributor of the second rotary joint part is accordingly pulled outside the device. The second rotary joint is a part that configures the rear side of the rotary joint, but a seal member is provided on the second distributor of the second rotary joint. Therefore, when the second distributor is removed outside the device as such, an operation of replacing the seal member can be performed outside the device, making it possible to easily perform the replacement operation.

Note that the first shaft of the first rotary joint part on which the seal member is provided remains on the device. However, the first rotary joint part is provided on a front side (an opposite side to the rear side) and the first shaft is at an easy-to-reach location. As a result, the operation of replacing the seal member can be easily performed even on the device. Therefore, according to the main spindle device of the present invention, the operation for replacing the seal member can be easily performed as a whole.

BRIEF DESCRIPTION OF DRAWING(S)

FIGURE is a side cross-sectional view showing an embodiment of a main spindle device for a machine tool according to the present invention.

DESCRIPTION OF EMBODIMENTS

Hereinafter, an embodiment of a main spindle device for a machine tool according to the present invention will be described with reference to FIGURE. Note that the present embodiment is an example in which the main spindle device is a rotary table device as a so-called indexing device that has a table to which a jig for holding a workpiece as a rotation target member, or the like is attached and is configured to index an angular position of the table. In addition, in the shown example, the rotary table device is a so-called vertical type rotary table device that is installed on an installation surface of the machine tool so that an attachment surface of the table for the jig is perpendicular to the installation surface.

As shown in FIGURE, the rotary table device 1 includes a frame 10 and a main spindle 20 rotatably supported to the frame 10. In addition, the rotary table device 1 includes a drive device 40 for rotationally driving the main spindle 20, a clamp device 50 for holding the main spindle 20 at an indexed angular position.

As for each of the components, the frame 10 has, as a main body, a body portion 11 that occupies the majority of the frame and is installed on an installation surface 2 of a machine tool. Note that the body portion 11 has an accommodation hole 13 penetrating toward the side (left-right direction in the drawing), has a space therein, and is configured so that the space is open on both side surfaces **11*a* and 11*b***.

Additionally, as for the main spindle 20, a table 3 on which a workpiece or the like is installed is attached to a tip end portion **20*b* of the main spindle 20. In addition, the main spindle 20 is rotatably supported to the body portion 11 of the frame 10 via a bearing 30 in the accommodation hole 13 in a state of an axis line direction of the main spindle being matched with a direction of a center line of the accommodation hole 13 and in a direction in which the tip end portion 20*b* becomes one end side (the left side in FIGURE) of the frame 10**.

Note that in the present embodiment, the main spindle 20 is configured by combining three shaft members each formed as a separate body in the axis line direction. Thereby, the main spindle 20 is configured by a first main spindle portion 21 that is a portion on the tip end side, a second main spindle portion 22 made of a shaft member attached to the first main spindle portion 21, and a third main spindle portion 23 made of a shaft member attached to the second main spindle portion 22.

In addition, in the main spindle 20, the second main spindle portion 22 and the third main spindle portion 23 are formed with through-holes **22*a* and 23*a* having centers matching a shaft center of the main spindle 20 and penetrating in the axis line direction. Furthermore, inner diameters of both the through-holes 22*a* and 23*a* are substantially the same. In addition, the first main spindle portion 21 is formed with a circular concave portion 21*a* opening to an end surface to which the second main spindle portion 22 is attached. Furthermore, the concave portion 21*a* has an inner diameter substantially the same as the inner diameter of the through-hole 22*a* of the second main spindle portion 22 and is formed to be continuous with the through-hole 22*a*. Thereby, the main spindle 20 is formed at a center in the axis line direction with a bottomed hole (hereinafter, referred to as "center hole") 20*a* configured by the concave portion 21*a* of the first main spindle portion 21 and the through-holes 22*a* and 23*a* of the second main spindle portion 22 and the third main spindle portion 23 and opening to an end surface 20*c*** on an opposite side to the tip end side.

In addition, the frame 10 has a cover portion 12 provided on the other end side thereof and attached to the side surface **11*a* of the body portion 11 in the form of covering the accommodation hole 13. Therefore, in the present embodiment, an end surface 12*b* on an outer side of the cover portion 12 is an end surface on the other end side of the frame 10. The cover portion 12 is formed with a through-hole 12***a* having a center matching the shaft center of the main spindle 20 and penetrating in the axis line direction. Additionally, an inner diameter of the through-hole 12*a* is larger than an inner diameter of the center hole 20*a* of the main spindle 20 (an inner diameter of the through-hole 23*a* of the third main spindle portion 23).

In the present embodiment, the drive device 40 uses a DD motor 41 as a drive source, which rotationally drives the main spindle 20 without intervening a drive transmission mechanism such as a gear. Furthermore, the DD motor 41 is a so-called inner rotor-type DD motor in which a motor rotor 42 is provided on an inner side of a motor stator 43. In the DD motor 41, the motor rotor 42 is fixed in the form of externally fitting to the second main spindle portion 22 of the main spindle 20. Additionally, the motor stator 43 is fixed to the body portion 11 (inner peripheral surface of the accommodation hole 13) of the frame 10 at a position that surrounds the motor rotor 42.

In addition, in the present embodiment, the clamp device 50 is a so-called disc-type clamp device that presses a piston 52 against a clamp disc 51 attached to the main spindle 20 and maintains an angular position of the main spindle 20 by clamping the clamp disc 51 in cooperation with the frame 10 (cover portion 12). In the clamp device 50, the clamp disc 51 is fixed to the end surface 20*c* of the third main spindle portion 23 of the main spindle 20. Additionally, the piston 52 is provided in the body portion 11 (accommodation hole 13) of the frame 10 so as to be displaceable in the axis line direction, in the form of sandwiching the clamp disc 51 with the cover portion 12 of the frame 10 in the axis line direction.

In the rotary table device 1 described above, in the present invention, the rotary table device 1 includes a rotary joint configured by a first rotary joint part and a second rotary joint part that are continuous in the axis line direction. In the rotary joint, the first rotary joint part is the other end side of the frame 10 and is configured by a first distributor having a shaft shape and a first shaft having a cylindrical shape, and the second rotary joint part is configured by a second distributor having a cylindrical shape and a second shaft having a shaft shape The rotary table device 1 according to the present invention will be described in more detail.

The rotary table device 1 includes a rotary joint 60 for supplying a working fluid 4 to a jig or the like installed on the table 3. The rotary joint 60 is configured by a first rotary joint part 70 and a second rotary joint part 80.

As for the first rotary joint part 70, the first rotary joint part 70 is configured by a first distributor 72 having a shaft shape and a first shaft 71 having a cylindrical shape and externally fitted to the first distributor 72. Furthermore, the first distributor 72 has a flange portion 74 that is a portion attached to the frame 10, in addition to a shaft-shaped main body portion 73 that is a main body portion of the first distributor. The flange portion 74 has a disc shape, and is formed on one end side in the axis line direction of the main body portion 73 to be concentrically continuous with an end portion on the one end side. Furthermore, an outer diameter of the flange portion 74 is larger than the inner diameter of the through-hole 12*a* of the cover portion 12 of the frame 10.

In the first distributor 72, a dimension of the main body portion 73 in the axis line direction is substantially the same as an interval between an end surface 23*b* on the second main spindle portion 22 side of the third main spindle portion 23 of the main spindle 20 and the end surface 12*b* on the other end side of the frame 10. Furthermore, in the present embodiment, the first shaft 71 corresponds to a portion (a portion on an inner periphery side) of the third main spindle portion 23 of the main spindle 20.

In addition, the first rotary joint part 70 is provided on the other end side of the frame 10 in such a form that the first distributor 72 is fitted to the first shaft 71 forming a part of the main spindle 20 at the main body portion 73 and is attached to the end surface 12*b* on the other end side of the frame 10 at the flange portion 74. Note that the first distributor 72 is attached to the frame 10 by screwing a screw member 75 inserted in the flange portion 74 of the first distributor 72 into the cover portion 12 of the frame 10. Thereby, the first distributor 72 is detachably attached to the frame 10.

The first rotary joint part 70 has, as a flow path for supplying the working fluid 4, a first flow path 72*a* formed in the first distributor 72 as a flow path through which the working fluid is supplied from the outside, a second flow path 71*b* formed in the first shaft 71 as a flow path corresponding to the first flow path 72*a*, and a first communication flow path 70*a* for communicating the first flow path 72*a* and the second flow path 71*b*. In addition, the first rotary joint part 70 has a third flow path 72*b* formed in the first distributor 72 as a flow path through which the working fluid is supplied from the outside and communicating with the second rotary joint part 80 to be described below, separately from the first flow path 72*a*.

As for the first flow path 72*a*, the first distributor 72 is formed with two (in the shown example) annular grooves 73*b* opening to an outer peripheral surface of the main body portion 73 and deviating in position in the axis line direction of the main body portion 73. In addition, the first flow paths 72*a* are formed in the same number (two) as the annular grooves 73*b* with deviating in position in a circumferential direction of the first distributor 72 (only one is shown in FIGURE). Each of the first flow paths 72*a* is formed to communicate with the corresponding annular groove 73*b* at one end thereof. Furthermore, each of the first flow paths 72*a* is formed to open to the outer peripheral surface of the flange portion 74 at the other end thereof. Therefore, each of the first flow paths 72*a* is formed such that a portion on the other end side extends radially in the flange portion 74.

In addition, as for the first communication flow path 70*a*, the first shaft 71 is formed with annular grooves 71*a* in the same number as the annular grooves 73*b* of the first distributor 72, the annular grooves 71*a* opening to an inner peripheral surface of the first shaft (an inner peripheral surface of the through-hole 23*a* of the third main spindle portion 23). Additionally, the annular groove 71*a* is formed at the same position as the annular groove 73*b* of the first distributor 72 in the axis line direction. The first communication flow path 70*a* is formed between the first distributor 72 and the first shaft 71 by the two annular grooves 73*b* and 71*a*.

In addition, as for the second flow path 71*b*, the second flow paths 71*b* of the same number (two) as the first communication flow paths 70*a* are formed to communicate with the corresponding first communication flow paths 70*a* (to open to the first communication flow path 70*a* at one end thereof), respectively. Accordingly, each of the second flow paths 71*b* is in communication with the corresponding first flow path 72*a* via the first communication flow path 70*a*. Additionally, the second flow paths 71*b* are also formed with deviating in position in the circumferential direction (only one is shown in FIGURE). Each of the second flow paths 71*b* is configured as a flow path opening to the end surface

23*b* on the second main spindle portion 22 side of the first shaft 71 (third main spindle portion 23) at the other end thereof.

Additionally, the first rotary joint part 70 is provided with seal members 76 such as an O-ring on both sides of each of the first communication flow paths 70*a* in order to prevent leakage of the working fluid 4 between the first distributor 72 and the first shaft 71 from each of the first communication flow paths 70*a*. Each of the seal members 76 is provided on the first distributor 72 and the first shaft 71 side, which is an outer side of the first shaft 71, and is fitted in an accommodation groove 71*c* formed to open to the inner peripheral surface of the first shaft 71.

Additionally, as for the third flow path 72*b*, six third flow paths 72*b* (in the shown example) are formed (only one is shown in FIGURE). Additionally, each of the third flow paths 72*b* is formed with deviating in position and at a position different from the first flow path 72*a*, in the circumferential direction of the first distributor 72. Similarly to the first flow path 72*a*, each of the third flow paths 72*b* is also formed to open to the outer peripheral surface of the flange portion 74 at one end thereof. However, each of the third flow paths 72*b* is formed to open to a tip end surface 73*a* of the main body portion 73 (an end surface on an opposite side to the flange portion 74 side) at the other end thereof.

Additionally, as for the second rotary joint part 80, the second rotary joint part 80 is configured by a second distributor 81 having a cylindrical shape and a second shaft 82 having a shaft shape to which the second distributor 81 is externally fitted. Note that a dimension of the second rotary joint part 80 in the axis line direction is such that it fits between the tip end surface 73*a* of the main body portion 73 of the first distributor 72 of the first rotary joint part 70 and a bottom surface of the center hole 20*a* of the main spindle 20.

In addition, in the present embodiment, the second distributor 81 of the second rotary joint part 80 is formed to have an outer diameter slightly smaller than an outer diameter of the main body portion 73 of the first distributor 72. The second distributor 81 is attached to the tip end surface 73*a* of the main body portion 73 of the first distributor 72. Accordingly, the second distributor 81 is provided in the form of being continuous with the main body portion 73 of the first distributor 72 on a side opposite to the flange portion 74 side in the axis line direction.

Note that as for the attachment of the second distributor 81 to the main body portion 73 of the first distributor 72, in the present embodiment, the tip end surface 73*a* of the main body portion 73 of the first distributor 72 is formed with a concave portion 73*al* having a concentric circle shape and having such a size that an end portion of the second distributor 81 is fitted. The second distributor 81 is fitted and attached to the concave portion 73*al* of the tip end surface 73*a* of the main body portion 73, and thus is in a concentric state with respect to the main body portion 73. Note that the attachment is performed by screwing a screw member 85 inserted in a through-hole formed to penetrate the main body portion 73 of the first distributor 72 in the axis line direction into the second distributor 81.

In addition, the second shaft 82 of the second rotary joint part 80 is configured by a shaft-shaped fitting portion 83 that is a portion to which the second distributor 81 is fitted and an attachment portion 84 that is a portion attached to the main spindle 20. Note that the attachment portion 84 is formed into a flange shape and is provided to be concentrically continuous with the fitting portion 83 on one end side in the axis line direction of the fitting portion 83. Additionally, an outer diameter of the attachment portion 84 is slightly smaller than the inner diameter of the center hole 20*a* of the main spindle 20 (an inner diameter of the concave portion 21*a* of the first main spindle portion 21).

In addition, in a state in which the fitting portion 83 is fitted into the second distributor 81, the second shaft 82 is attached to the bottom surface of the center hole 20*a* of the main spindle 20 (a bottom surface of the concave portion 21*a* of the first main spindle portion 21 of the main spindle 20) at the attachment portion 84. Note that the attachment is performed by screwing a screw member 86 inserted in a through-hole formed in the attachment portion 84 of the second shaft 82 into the first main spindle portion 21.

In addition, the second rotary joint part 80 has, as a flow path for supplying the working fluid 4, a fourth flow path 81*a* formed in the second distributor 81 as a flow path communicating with the third flow path 72*b* of the first distributor 72, a fifth flow path 82*a* formed in the second shaft 82 as a flow path corresponding to the fourth flow path 81*a*, and a second communication flow path 80*a* for communicating the fourth flow path 81*a* and the fifth flow path 82*a*.

As for the fourth flow path 81*a*, the fourth flow path 81*a* is a flow path that communicates with the third flow path 72*b* of the first distributor 72 as described above, and therefore is provided in the same number (6) as the third flow paths 72*b*. Similarly to the third flow paths 72*b*, each of the four flow paths 81*a* deviates in position in the circumferential direction of the second distributor 81, and is formed at a position communicating with the third flow path 72*b* at one end thereof (only one is shown in FIGURE). Note that the one end of each of the four flow paths 81*a* is formed to open to an end surface on the first distributor 72 side of the second distributor 81 in order to communicate with the third flow path 72*b*.

Additionally, the second distributor 81 is formed with annular grooves 81*b* opening to an inner peripheral surface thereof in the same number (six) as the fourth flow paths 81*a* with deviating in position in the axis line direction. Each of the fourth flow paths 81*a* is formed to communicate with the corresponding annular groove 81*b* at the other end thereof.

In addition, as for the second communication flow path 80*a*, the second shaft 82 is formed with annular grooves 83*b* opening to an outer peripheral surface of the fitting portion 83 and provided in the same number as the annular grooves 81*b* of the second distributor 81. Additionally, the annular groove 83*b* is formed at the same position as the annular groove 81*b* of the second distributor 81 in the axis line direction. The second communication flow path 80*a* is formed between the second distributor 81 and the second shaft 82 by the two annular grooves 81*b* and 83*b*.

In addition, as for the fifth flow path 82*a*, the fifth flow paths 82*a* of the same number (six) as the second communication flow paths 80*a* are formed to communicate with the corresponding second communication flow paths 80*a* (to open to the second communication flow path 80*a* at one end thereof), respectively. Accordingly, each of the fifth flow paths 82*a* is in communication with the corresponding fourth flow path 81*a* via the second communication flow path 80*a*. Additionally, each of the fifth flow paths 82*a* is also formed with deviating in position in the circumferential direction (only one is shown in FIGURE). Each of the fifth flow paths 82*a* is configured as a flow path opening to an end surface, which is attached to the main spindle 20, of the attachment portion 84 of the second shaft 82 at the other end thereof.

Additionally, the second rotary joint part 80 is provided with seal members 87 such as an O-ring on both sides of each of the second communication flow paths 80*a* in order to prevent leakage of the working fluid 4 between the second distributor 81 and the second shaft 82 from each of the second communication flow paths 80*a*. Each of the seal members 87 is provided on the second distributor 81 and the second distributor 81 side, which is an outer side of the second shaft 82, and is fitted in an accommodation groove 81*c* formed to open to the inner peripheral surface of the second distributor 81.

In the rotary table device 1 including the rotary joint 60 configured by the first rotary joint part 70 and the second rotary joint part 80 as described above, in the first rotary joint part 70, the working fluid 4 supplied from the opening of the flange portion 74 via the first flow path 72*a*, the first communication flow path 70*a*, and the second flow path 71*b* is supplied to a jig or the like installed on the table 3 via the flow path 22*b* in the second main spindle portion 22 and the flow path 21*b* in the first main spindle portion 22, which are formed in the main spindle 20 so as to span in the axis line direction, and the flow path 3*a* formed to penetrate the table 3.

In addition, the working fluid is supplied from the opening of the flange portion 74 of the first rotary joint part 70 (first distributor 72) to the second rotary joint part 80 via the third flow path 72*b*. In the second rotary joint part 80, the working fluid 4 supplied via the fourth flow path 81*a*, the second communication flow path 80*a*, and the fifth flow path 82*a* is supplied to the jig or the like installed on the table 3 via the flow path 21*c* formed to penetrate the first main spindle portion 22 of the main spindle 20 in the axis line direction, and the flow path 3*b* formed to penetrate the table 3.

In the rotary table device 1 described above, when replacing the seal members 76 and 87 in the rotary joint 60, the first distributor 72 of the first rotary joint part 70 is removed from the frame 10. Note that as the first distributor 72 is removed, on the other end side of the frame 10, the through-hole 12*a* of the cover portion 12 communicating with the center hole 20*a* of the main spindle 20 is opened (exposed) to the outside.

As the first distributor 72 is removed as described above, in the portion of the first rotary joint part 70, the seal member 76 provided on the inner peripheral surface of the first shaft 71 is exposed to the center hole 20*a* communicating with the through-hole 12*a*. Since the first shaft 71 is a part of the third main spindle portion 23 that is located on the through-hole 12*a* side in the rotary joint 60 and is present adjacent to the through-hole 12*a*, the operation of replacing the seal member 76 can be easily performed via the through-hole 12*a* even on the device.

On the other hand, in the rotary joint 60, as for the replacement of the seal member 87 in the second rotary joint part 80 on a rear side that is a side far from the through-hole 12*a*, since the second distributor 81 is attached to the first distributor 72 as described above, as the first distributor 72 is removed from the frame 10 as described above, the second distributor 81 is also simultaneously pulled out from the accommodation hole 13 of the frame 10 (out of the frame 10).

In the second rotary joint part 80, the second distributor 81 is externally fitted to the second shaft 82 as described above, and the seal member 87 is provided on the second distributor 81. Therefore, the operation of replacing the seal member 87 can be performed on the second distributor 81 pulled out of the frame 10. In addition, since the through-hole of the second distributor 81 is open to the outside on the side opposite to the first distributor 72 side, the operation of replacing the seal member 87 can be performed from the opening side of the second distributor 81. Thereby, the operation of replacing the seal member 87 can be easily performed.

As described above, according to the rotary table device 1 of the present invention, replacement of the seal member in the rotary joint 60 is performed in the form of removing the distributor similarly to the related art. However, in this case, not only the seal member 76 on the side close to the through-hole 12*a*, which becomes the opening of the frame 10 when the distributor (the first distributor 72 and the second distributor 81 attached thereto) is removed, but also the seal member 87 located at the rear side in the rotary joint 60 can be easily replaced. Therefore, the seal members 76 and 87 can be easily replaced as a whole of the rotary joint 60.

Note that the present invention is not limited to the above embodiment, and can also be implemented in modified aspects (modified embodiments), as described in the following (1) to (4).

(1) As for the arrangement of the first rotary joint part (first shaft) with respect to the main spindle, in the above embodiment, the first shaft 71 of the first rotary joint part 70 is configured by a part of the main spindle 20 (a part on the inner periphery side of the third main spindle portion 23). That is, the first shaft 71 is configured integrally with the main spindle 20. However, in the present invention, the first shaft of the first rotary joint part may be configured by a member separate from the main spindle.

For example, similarly to the above embodiment, in a rotary table device in which the clamp disc of the clamp device is attached to the main spindle, the first shaft may be provided to be attached to an end surface on a side opposite to the tip end side of the main spindle. Note that in this case, a depth dimension of the center hole in the main spindle is substantially the same as the dimension in the axis line direction of the second rotary joint part.

In addition, the main spindle may be formed so that the inner diameter of the center hole is larger than the outer diameter of the first shaft of the first rotary joint part, and the first shaft (first rotary joint part) may be provided in a form of being accommodated in the center hole of the main spindle in the radial direction of the main spindle. However, in this case, in order for the first shaft to be in a state of being provided to be non-rotatable to the main spindle, the first shaft is configured to have a portion that, in addition to a portion externally fitted to the main body portion of the first distributor, extends from the portion to the bottom surface of the center hole in the main spindle. Additionally, the first shaft may be attached to the bottom surface of the center hole at an end portion of the extending portion.

(2) As for the method of providing the second distributor of the second rotary joint part with respect to the first distributor (main body portion) of the first rotary joint part, in the above embodiment, in order for the second distributor 81 to be provided in the concentric shape with respect to the main body portion 73 of the first distributor 72, the tip end surface 73*a* of the main body portion 73 of the first distributor 72 is formed with the concave portion 73*a1* having a concentric circle shape and the second distributor 81 is fitted into the concave portion 73*a1*, so that attachment of the second distributor 81 in a concentric state is implemented. However, the configuration for making the second distributor be in the concentric state is not limited to the above configuration and may be implemented by, for example, a positioning structure using a positioning pin or the like.

In addition, in the example described above, the second distributor is formed as a separate member from the first distributor and is provided in a form of being attached to the first distributor (main body portion). However, in the present invention, the second distributor may be formed integrally with the first distributor and may be provided as a part of a single member including the first distributor.

Additionally, in the above embodiment, the second distributor 81 is formed so that the outer diameter is smaller than the outer diameter of the main body portion 73 of the first distributor 72. However, in the present invention, the second distributor may be formed such that the outer diameter is equal to or smaller than the outer diameter of the main body portion of the first distributor, or may be formed so that the outer diameter is the same as the outer diameter of the main body portion.

(3) As for the second shaft of the second rotary joint part, in the above embodiment, the second shaft 82 is configured as a separate member from the main spindle 20. However, in the present invention, the second shaft of the second rotary joint part may be formed integrally with the main spindle. For example, in a rotary table device in which the main spindle is configured similarly to the above embodiment, the second shaft may be arranged with respect to the first main spindle portion of the main spindle in a similar manner to the above embodiment and may be formed integrally with the first main spindle portion (may be included in a single member including the first main spindle portion).

(4) As for the main spindle device for a machine tool on which the present invention is premised, the above embodiment is an example in which the main spindle device is the rotary table device 1 as an indexing device. In such a case where the main spindle device is the rotary table device, the rotary table device is not limited to using the DD motor as in the above embodiment as a drive device and may be configured to use a drive motor (rotation motor) and to drive the main spindle via a drive transmission mechanism such as a worm gear mechanism. In addition, the rotary table device is not limited to one having, as a clamp device, the disc-type device as in the above embodiment and may also have other known devices such as a sleeve-type device. Additionally, the rotary table device is not limited to the vertical type as in the above embodiment, and may also be of a horizontal type.

In addition, the main spindle device is not limited to an indexing device such as the rotary table device described above and may also be another known indexing device such as an inclined rotary table device. Additionally, the main spindle device is not limited to the indexing device, and may also be a main spindle driving device (spindle device) that continuously rotationally drives a main spindle to which a tool as a rotation target member is attached. The present invention is not limited to the above embodiment and the modified embodiments, and can be variously changed without departing from the gist of the present invention.

The invention claimed is:

1. A main spindle device for a machine tool comprising a main spindle having a tip end portion to which a rotation target member is attached, the main spindle being rotatably supported to a frame so that the tip end portion becomes one end side of the frame; and a rotary joint including a distributor fixedly provided to the frame and a shaft provided to be non-rotatable to the main spindle, the rotary joint being configured such that a flow path of the distributor on a fixed side and a flow path of the shaft on a rotating side communicate with each other, wherein the distributor includes a first distributor and a second distributor, the shaft includes a first shaft and a second shaft, and the rotary joint includes a first rotary joint part including the first distributor and the first shaft, and a second rotary joint part including the second distributor and the second shaft, wherein in the first rotary joint part, the first distributor is formed to have a shaft-shaped main body portion serving as a main body and a flange portion provided at an end portion of the main body portion, the first distributor is attached to an end surface of the other end side of the frame at the flange portion in a form of the main body portion being accommodated in the frame, and the first shaft having a cylindrical shape and fitted to the main body portion, and wherein in the second rotary joint part, the second distributor has a cylindrical shape, the second distributor is provided to be concentrically continuous to the main body portion on an opposite side to the flange portion side in an axis line direction of the main body portion, the second distributor is formed such that an outer diameter thereof is equal to or smaller than an outer diameter of the main body portion, and the second shaft has a shaft shape and the second distributor is fitted thereto.

* * * * *